(12) United States Patent
Nam et al.

(10) Patent No.: US 12,498,715 B2
(45) Date of Patent: Dec. 16, 2025

(54) VEHICLE FOR OUTPUTTING A VISUAL STIMULUS IMAGE AND METHOD FOR CONTROLLING THE SAME

(71) Applicants: Hyundai Motor Company, Seoul (KR); Kia Corporation, Seoul (KR); IUCF-HYU (Industry-University Cooperation Foundation Hanyang University), Seoul (KR)

(72) Inventors: Seung Kyu Nam, Seoul (KR); Il Yong Yoon, Seoul (KR); Tae Jun Lee, Suwon-si (KR); Chang Hwan Im, Seoul (KR); Jin Uk Kwon, Seoul (KR); Hye Rin Nam, Seoul (KR); Ji Hun Hwang, Seoul (KR)

(73) Assignees: Hyundai Motor Company, Seoul (KR); Kia Corporation, Seoul (KR); IUCF-HYU (Industry-University Cooperation Foundation Hanyang, Seoul (KR)

( * ) Notice: Subject to any disclaimer, the term of this patent is extended or adjusted under 35 U.S.C. 154(b) by 429 days.

(21) Appl. No.: 17/984,966

(22) Filed: Nov. 10, 2022

(65) Prior Publication Data
US 2023/0341846 A1 Oct. 26, 2023

(30) Foreign Application Priority Data
Apr. 22, 2022 (KR) .......................... 10-2022-0050244

(51) Int. Cl.
G05D 1/00 (2024.01)
G06F 3/01 (2006.01)

(52) U.S. Cl.
CPC ........... *G05D 1/0016* (2013.01); *G06F 3/015* (2013.01)

(58) Field of Classification Search
CPC .. G05D 1/0016; G06F 3/015; A61G 2203/20; A61G 2203/30; A61G 5/046; A61G 5/041; A61G 5/10; A61G 2200/34; A61G 2203/10; A61G 2203/18; A61G 2203/70; G16H 40/63; B60K 35/00; B60K 35/22;
(Continued)

(56) References Cited

U.S. PATENT DOCUMENTS 11,926,344 B1 *  3/2024  Roy ....................... G06V 20/56
2015/0358096 A1 * 12/2015  Chi ....................... H04J 3/0661
                                                              370/350

FOREIGN PATENT DOCUMENTS

| CN | 105938397 A | 9/2016 |
| CN | 107122050 B | 5/2019 |
| CN | 110251064 A | 9/2019 |

(Continued)

OTHER PUBLICATIONS

Merged PE2E English Translation of CN111631907A (Year: 2020).*
(Continued)

*Primary Examiner* — James J Lee
*Assistant Examiner* — Andrew Sang Kim
(74) *Attorney, Agent, or Firm* — Banner & Witcoff, Ltd.

(57) ABSTRACT

A vehicle includes a drive for driving the vehicle, a display for outputting a visual stimulus image, and a controller that controls the drive and the display, the visual stimulus image contains a visual stimulus object having a repeating pattern, and the controller outputs, via the display, the visual stimulus image in which a size of the visual stimulus object changes over time.

20 Claims, 10 Drawing Sheets

(58) Field of Classification Search
CPC .............. B60K 2360/334; B60K 35/81; B60Y 2200/84
See application file for complete search history.

(56) References Cited

FOREIGN PATENT DOCUMENTS

| | | | |
|---|---|---|---|
| CN | 108803873 B | | 3/2020 |
| CN | 111631848 A | | 9/2020 |
| CN | 113349803 A | * | 9/2021 |
| KR | 20200057214 A | * | 5/2020 |
| WO | 2021-008087 A1 | | 1/2021 |

OTHER PUBLICATIONS

Espacenet English Translation of KR20200057214A (Year: 2020).*
Muller, Using a SSVEP-BCI to Command a Robotic Wheelchair (Year: 2011).*
Espacenet English Translation of CN113349803A (Year: 2021).*
Zhu, A_Survey_of_Stimulation_Methods_Used_in_SSVEP_Based_BCIs, Jan. 4, 2010, Computational Intelligence and Neuroscience (Year: 2010).*
Merged PE2E English Translation of CN210541550U (Year: 2020).*
Bieger et al. "Effects of Stimulation Properties in Steady-State Visual Evoked Potential Based Brain-Computer Interfaces", EMBC, 2010.
Han et al. "Highly Interactive Brain-Computer Interface Based on Flicker-Free Steady-State Motion Visual Evoked Potential", Scientific Reports, 2018.
Xie et al. "Steady-State Motion Visual Evoked Potentials Produced by Oscillating Newton's Rings: Implications for Brain-Computer Interfaces", Plos One, 2012, Jun. 2012, vol. 7, Isssu 6.
File:Steady-State-Motion-Visual-Evoked-Potential-(SSMVEP)-Based-on-Equal-Luminance-Colored-Enhancementpone.0169642.s003.ogv, printed Nov. 8, 2022, ure.com/scientificreports.

* cited by examiner

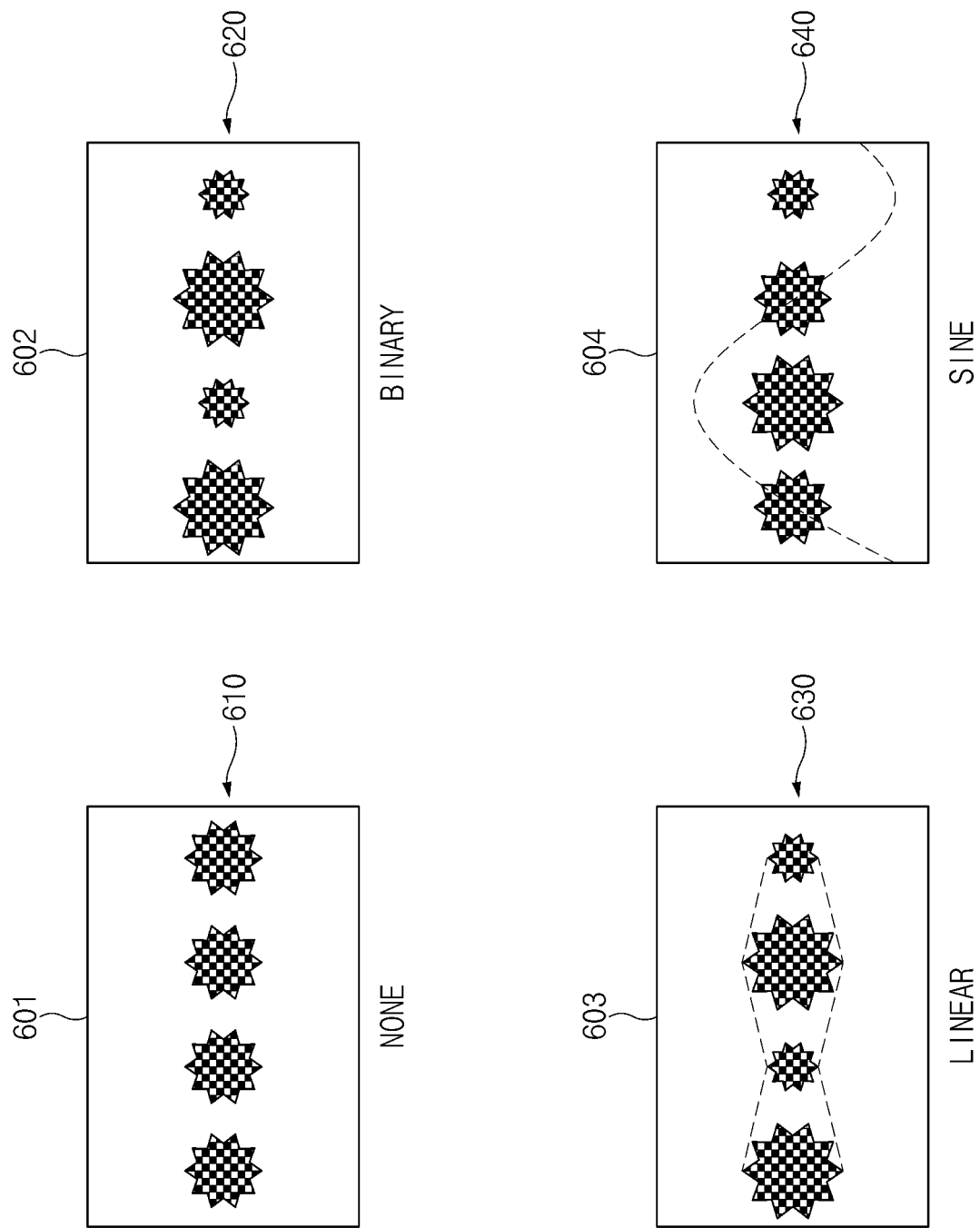

VEHICLE FOR OUTPUTTING A VISUAL STIMULUS IMAGE AND METHOD FOR CONTROLLING THE SAME

CROSS-REFERENCE TO RELATED APPLICATION

This application claims the benefit of priority to Korean Patent Application No. 10-2022-0050244, filed in the Korean Intellectual Property Office on Apr. 22, 2022, the entire contents of which are incorporated herein by reference.

TECHNICAL FIELD

The present disclosure relates to a vehicle controllable based on a visual stimulus and a method for controlling the same.

BACKGROUND

A vehicle (e.g., an electric powered wheelchair, a transport robot, etc.) controlled using a brain-computer interface (hereinafter, BCI) is under research. The BCI technology attempts to detect a brainwave associated with a thinking process of a human and deliver the brainwave to a controller of the vehicle such that the controller executes a command corresponding to the brainwave to control the vehicle to move (e.g., go straight, backward, change a direction, and turn) or stop.

With respect to the BCI technology, it may be difficult to detect a brainwave signal and may be difficult to distinguish the brainwave signal from other signals. To increase the practicality of the BCI technology, a system with high performance and fast recognition speed, a system that does not require a data collection time required for model training (pre-training), or requires minimal model training, or a system that may be easily worn and used by anyone need to be developed.

SUMMARY

The following summary presents a simplified summary of certain features. The summary is not an extensive overview and is not intended to identify key or critical elements.

A SSVEP (Steady-State Visual Evoked Potential) is a brainwave signal generated due to repetitive visual stimulus (frequency stimulus). The SSVEP is a type of reactive BCI resulting from external stimulus. When the SSVEP is used, a system using the BCI may provide high performance, fast recognition speed, and may recognize the brainwave signal significant training of the system.

When a user gazes at an object (e.g., a stimulus that is reversed/reverted/toggled at a certain period), a brainwave of the user may be synchronized with a frequency of the gazed object, so that a large SSVEP may be measured at the corresponding frequency.

In general, a visual stimulus that flickers at a constant frequency (e.g., 6 Hz) may be used to induce the SSVEP. In the case of the flickering visual stimulus, it may be difficult to use the flickering visual stimulus because a visual fatigue of the user is induced.

Alternatively, a stimulus having a checkerboard pattern (hereinafter, a checkerboard stimulus) may be used to induce the SSVEP. The checkerboard pattern of the checkerboard stimulus is reversed/reverted/toggled at a certain period, so that the checkerboard stimulus induces a SSVEP signal. Compared with the flickering stimulus, the checkerboard stimulus may reduce the visual fatigue of the user because the frequency (e.g., the number of times) of stimulus reversal/reversion/toggling required to induce the SSVEP is reduced (e.g., halved).

A steady-state motion visual evoked potential (hereinafter, SSMVEP) that may induce the SSVEP via a stimulus movement rather than the stimulus reversal/reversion/toggling is being studied. The SSMVEP may be induced via contraction/expansion of the stimulus or a phase change of a Newtonian ring. Such movement of the stimulus also exhibits the same brainwave characteristics as the existing SSVEP.

In an example, an image for the visual stimulus (hereinafter, a visual stimulus image) may be output via an LCD or LED monitor. In this case, a high SSVEP recognition performance may appear because of clear stimulus exposure as the user gazes directly at a light source. In this instance, the user gazes at the visual stimulus image on the monitor at a fixed position, which may cause discomfort and increase the visual fatigue of the user.

As an alternative technology to replace the LCD or LED monitor, a scheme using an augmented reality (AR) device and the like is being discussed, but there is a problem of a low SSVEP recognition performance caused by limitations (e.g., in a surrounding environment and/or in a device use), such as a stimulus intensity, ambient light, a stimulus background change, a stimulus clarity, and a stimulus size.

The present disclosure has been made to address the above-mentioned problems.

An aspect of the present disclosure provides a vehicle that outputs a visual stimulus image that reflects various factors such as a stimulus form, a motion change, a motion change speed, and a stimulus pattern change to improve a recognition performance of a SSVEP-based BCI.

The technical problems to be solved by the present disclosure are not limited to the aforementioned problems, and any other technical problems not mentioned herein will be clearly understood from the following description by those skilled in the art to which the present disclosure pertains.

A vehicle may comprise: a drive configured to drive the vehicle; a display configured to output a visual stimulus image; and a controller configured to control the drive and the display, wherein the visual stimulus image comprises a visual stimulus object associated with a repeating pattern, and wherein the controller is configured to control an output, via the display, of the visual stimulus image in which a size of the visual stimulus object changes over time.

The visual stimulus object may be associated with a movement of the vehicle. The visual stimulus object may comprise a plurality of visual stimulus objects respectively associated with different output frequencies. The repeating pattern may be a checkerboard pattern. An arrangement state of the repeating pattern may be maintained while the size of the visual stimulus object is changed. The visual stimulus object may be in a form of repetition of a stimulus of a first size and a stimulus of a second size over time. The first size may be a size enlarged by a ratio from a reference size. The second size may be a size reduced by a ratio from a reference size. The size of the visual stimulus object may change based on a preset waveform. The visual stimulus object may comprise a form of a polygonal star (or any other forms). The display may be a projector, and the controller may be configured to control the display to output the visual stimulus image on a portion of a surface spaced apart from the vehicle. The visual stimulus object may be disposed in a lower end region in a vertical direction in the visual stimulus image. The projector may be mounted at a lower end of the vehicle. The vehicle may comprise an electroencephalogram (EEG) device configured to: sense a brainwave of a user; establish a channel with the controller via a wireless communication; and transmit a signal corresponding to the brainwave to the controller via the channel. The EEG device may be configured for mounting on a head of the user to generate an electrical signal corresponding to the brainwave. The brainwave may be associated with a steady-state visual evoked potential (SSVEP).

A method may comprise: outputting, via a display of a vehicle, a visual stimulus image in which a size of a visual stimulus object changes over time, wherein the visual stimulus object is associated with a repeating pattern; generating a control signal corresponding to the visual stimulus image; and controlling the vehicle using the control signal.

The generating of the control signal may comprise: detecting, via an electroencephalogram (EEG) device of the vehicle, a brainwave of a user induced by the visual stimulus image, wherein the control signal corresponds to the brainwave. The visual stimulus object may comprise a plurality of visual stimulus objects respectively associated with different output frequencies. The repeating pattern may be a checkerboard pattern, and an arrangement state of the repeating pattern may be maintained while the size of the visual stimulus object is changed.

These and other features and advantages are described in greater detail below.

BRIEF DESCRIPTION OF THE DRAWINGS

The above and other objects, features and advantages of the present disclosure will be more apparent from the following detailed description taken in conjunction with the accompanying drawings:

FIG. 6 shows a size change of a visual stimulus object having a checkerboard pattern;

DETAILED DESCRIPTION

Figure 1:
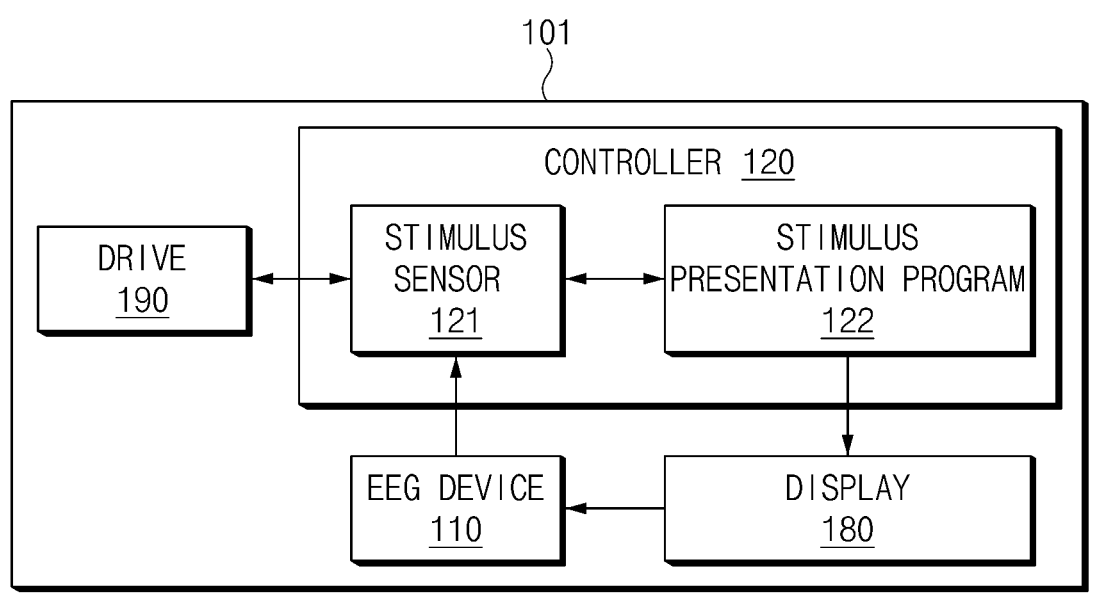
FIG. 1 is a block diagram of a vehicle.

Hereinafter, various examples of the present disclosure will be described in detail with reference to the exemplary drawings. In adding the reference numerals to the components of each drawing, it should be noted that the identical or equivalent component is designated by the identical numeral even when they are displayed on other drawings. Further, in describing one or more examples of the present disclosure, a detailed description of the related known configuration or function will be omitted when it is determined that it interferes with the understanding of the gist of the present disclosure.

In describing the components of one or more configurations according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, with reference to FIGS. 1 to 8, various examples of the present disclosure will be described in detail.

FIG. 1 is a block diagram of a vehicle.

Referring to FIG. 1, a vehicle 101 may include an electroencephalogram (EEG) device 110, a controller 120 (e.g., including processor(s), control circuit(s), microcontroller(s), etc.), a display 180 (e.g., a projector or other displays), and a drive 190 (e.g., including motor(s), and/or any other motion controller(s) to provide motion to, or change motion of, the vehicle or part thereof). Hereinafter, a discussion is focused on an electric powered wheelchair as an example of the vehicle 101, but aspects of the present disclosure are not limited thereto.

The EEG device 110 may be mounted on a user's body (e.g., head) and may measure SSVEP (Steady-State Visual Evoked Potential). The EEG device 110 may transmit an EEG signal corresponding to the SSVEP to the controller 120 in real time. The EEG device 110 may include a plurality of electrodes in contact with the user's scalp. The EEG device 110 may be worn on the user's head in a gel-free scheme (in a dry manner) or a gel-using scheme (in a wet manner). The EEG device 110 may transmit the EEG signal to the controller 120 (e.g., via wireless communication, such as Bluetooth communication or any other wireless communication technology, for user convenience).

The controller (or the processor) 120 may control the drive 190 based on a signal received from the EEG device 110, or may control the display 180 to output a visual stimulus image. The controller 120 may include a stimulus sensor 121 and a stimulus presentation program 122.

The stimulus sensor (e.g., the BCI system) 121 may receive the EEG signal corresponding to the SSVEP from the EEG device 110. For example, the stimulus sensor 121 may receive the EEG signal from the EEG device 110 via wireless communication (e.g., a Bluetooth communication or any other wireless communication).

The stimulus sensor 121 may generate a control signal for controlling the drive 190, for example, based on an analysis result of the EEG signal. The stimulus sensor 121 may transmit the control signal corresponding to the EEG signal to the drive 190. For example, the stimulus sensor 121 may transmit the control signal, such as a go-straight signal, a turn-left signal, a turn-right signal, or a stop signal to the drive 190 (e.g., via a serial communication).

The stimulus sensor 121 may be connected to a separate controller (not shown) via wireless communication (e.g., Bluetooth or any other wireless communication) for safety. The drive 190 may be controlled, based on a user input (e.g., an input directly received from a hand of the user) received via a user interface and transferred to the controller (not shown).

The stimulus sensor 121 may transmit visual stimulus information to the stimulus presentation program 122 in a communication configured scheme (e.g., in the serial communication scheme). For example, the visual stimulus information may include information indicating a start of a visual stimulus or information indicating an end of the visual stimulus.

The stimulus presentation program 122 may control the display 180. The stimulus presentation program 122 may cause the display 180 to start or end outputting the visual stimulus image. Further, the stimulus presentation program 122 may receive the visual stimulus information from the stimulus sensor 121. The stimulus presentation program 122 may transmit the visual stimulus image to the display 180, for example, based on the received visual stimulus information. The stimulus presentation program 122 may transmit the visual stimulus image to the display 180 in a configured communication scheme (e.g., in a HDMI communication scheme).

The stimulus presentation program 122 may be implemented as a separate computing device (or a personal computer) from the stimulus sensor 121.

The display 180 may display the visual stimulus image received from the stimulus presentation program 122. For example, the display 180 may comprise a monitor (e.g., an LCD or LED monitor). As another example, the display 180 may be a projector. The visual stimulus image may be projected on a bottom surface at a position spaced by a specific distance from a front surface of the vehicle 101.

The visual stimulus image may contain direction indicators (e.g., a go-forward indication object, a turn-left indication object, and a turn-right indication object). If the user gazes at one of the direction indicators contained in the visual stimulus image for a duration equal to or greater than a configured time duration, a corresponding SSVEP may be generated in the user's head. The SSVEP generated in the user's head may be measured via the electrode of the EEG device 110.

Each of the direction indicators (e.g., the go-forward, turn-left, or turn-right indication objects) may be projected at a different flickering frequency. For example, the turn-right indication object may be output with the flickering frequency of 6 Hz, and the turn-left indication object may be output with the flickering frequency of 10 Hz.

The drive 190 may receive the control signal from the stimulus sensor 121 in the configured communication scheme (e.g., in the serial communication scheme). The stimulus sensor 121 may generate the control signal corresponding to a user's intention, for example, based on the analysis result of the EEG signal. The drive 190 may move, stop or turn the vehicle 101, for example, in response to the received control signal. The user may identify a gazing result of the visual stimulus image in feedback to an operation of the drive 190, and may control a movement of the vehicle 101.

Figure 2:
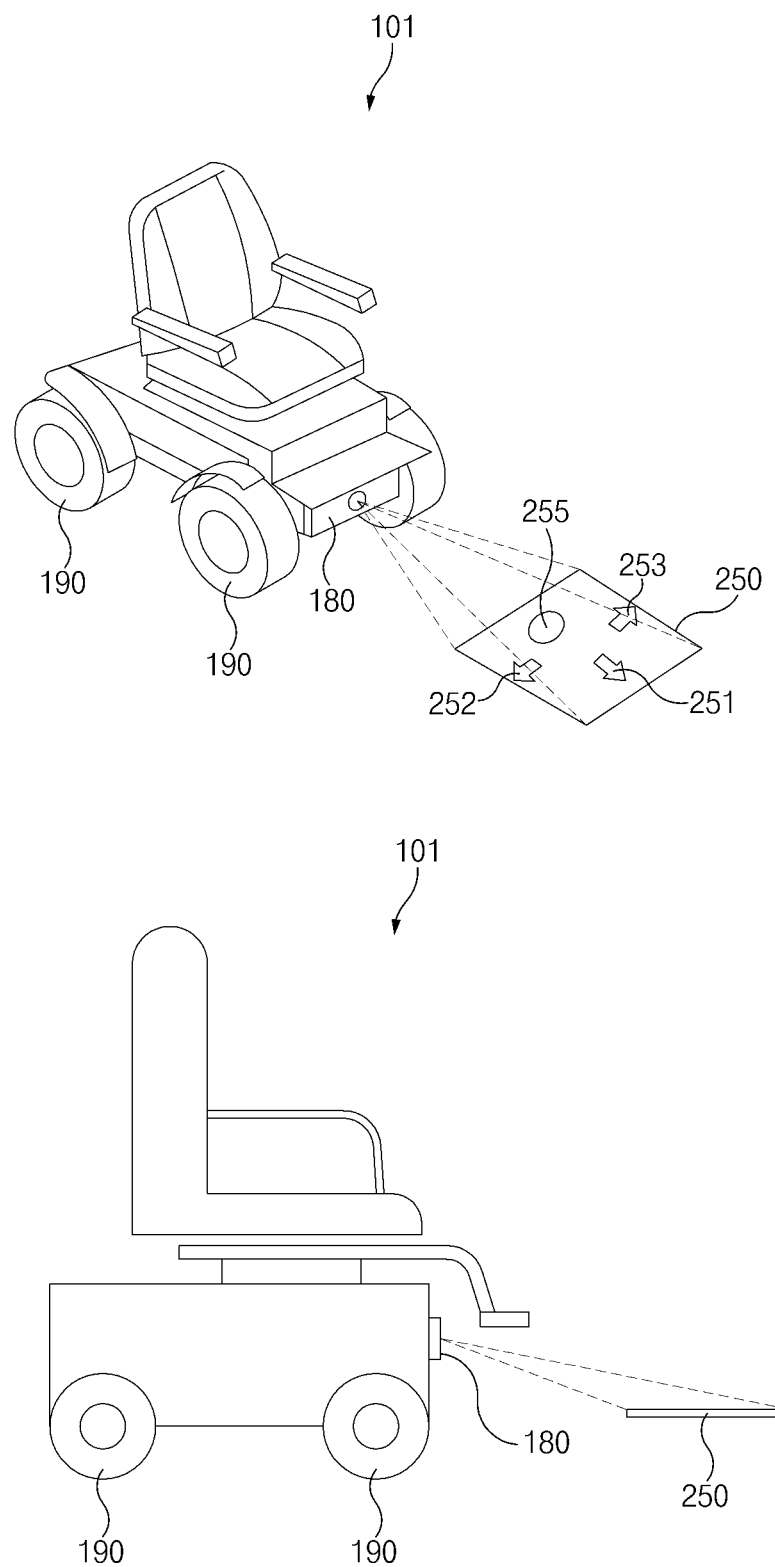
FIG. 2 is a diagram showing an electric powered wheelchair as an example of a vehicle including a display in a form of a projector.

FIG. 2 is a diagram showing an electric powered wheelchair as an example of a vehicle including a display in a form of a projector. The electric powered wheelchair shown in FIG. 2 is only an example of the vehicle, but aspects of the present disclosure are not limited thereto.

Referring to FIGS. 1 and 2, the vehicle (e.g., the electric powered wheelchair) 101 may include the display 180 to project a visual stimulus image 250. A battery, a device, a circuit, and/or a board for an operation of the controller 120 may be included in (e.g., installed inside) the vehicle 101.

The visual stimulus image (e.g., a projected image) 250 may be projected on the bottom surface at a position spaced apart by a configured distance from the front surface of the vehicle 101. The visual stimulus image 250 may include direction indication objects 251, 252, and 253 or a stop indication object 255.

The direction indication objects 251, 252, and 253 may be projected while flickering at different frequencies in different directions. For example, the turn-right indication object 252 may be output with the flickering frequency of 6 Hz, and the turn-left indication object 253 may be output with the flickering frequency of 10 Hz.

Each of the object direction indication objects 251, 252, and 253 or the stop indication object 255 included in the visual stimulus image 250 may have a specific pattern. For example, each of the direction indication objects 251, 252, and 253 may have a checkerboard pattern, and black and white of the checkerboard pattern thereof may be reversed/reverted/toggled with each other over time.

The visual stimulus image 250 may have a configured contrast ratio (e.g., 22,000:1 or any other suitable contrast ratio) to increase SSVEP stimulus performance. Thus, the smaller the distance from the projected surface, the brighter the visual stimulus image 250. However, in this case, a size of the visual stimulus image 250 may be small and interference between the objects may occur. For this reason, the visual stimulus image 250 may have the configured contrast ratio to address the problem related to the smaller size of the visual stimulus image and to reduce or prevent SSVEP recognition errors (e.g., caused by the interference between the objects).

If the user gazes at one of the objects (the object direction indication objects 251, 252, and 253 or the stop indication object 255) included in the visual stimulus image 250 for a configured time duration, the corresponding SSVEP may be generated in the user's head. The SSVEP generated in the user's head may be measured and detected through the electrode of the EEG device 110 mounted on the user's head. The measured SSVEP may be used to control the drive 190 of the vehicle 101.

For example, if the user gazes at the turn-right indication object 252 for two seconds or longer, a corresponding SSVEP (a first SSVEP) may be measured via the EEG device 110. The EEG device 110 may generate a corresponding EEG signal (a first EEG signal) and transmit the first EEG signal to the controller 120. The controller 120 may receive the first EEG signal from the EEG device 110. The controller 120 may compare a preset reference value with the first EEG signal and may generate a first control signal to control the drive 190 to perform a turn-right movement, for example, based on the comparing result. The controller 120 may transmit the first control signal to the drive 190. If the drive 190 receives the first control signal, the drive 190 may turn the vehicle 101 to the right.

If the user gazes at the turn-left indication object 253 for two seconds or longer, a corresponding SSVEP (a second SSVEP) may be measured via the EEG device 110. The EEG device 110 may generate a corresponding EEG signal (a second EEG signal) and transmit the second EEG signal to the controller 120. The controller 120 may receive the second EEG signal from the EEG device 110. The controller 120 may compare a preset reference value with the second EEG signal and may generate a second control signal to control the drive 190 to perform a turn-left movement, for example, based on the comparing result. The controller 120 may transmit the second control signal to the drive 190. If the drive 190 receives the second control signal, the drive 190 may turn the vehicle 101 to the left.

The display 180 may be mounted on a lower end of the front surface of the vehicle 101, and may output the visual stimulus image 250 towards the bottom surface at the position spaced by the configured distance from the front surface of the vehicle 101. The display 180 may be mounted on the vehicle 101 in a manner to adjust projection angles and projection distances. For example, the display 180 may rotate about an axis of rotation or may slide via a mount.

The display 180 may be mounted to project light toward a specific direction (e.g., a downward direction). For example, in general, a display that outputs light upwards may be mounted in a reverse direction to project the light downwards. Thus, the visual stimulus image 250 may be projected to the position spaced by the distance from the front surface thereof (e.g., via a small angular change of the projection), and user convenience in getting on and off the vehicle and convenience of using a footrest while sitting on the vehicle may be improved.

The visual stimulus image 250 may be displayed on the bottom surface spaced apart by the configured distance from the front surface of the vehicle 101. For example, at the front surface of the vehicle 101, a horizontal distance from the visual stimulus image 250 to a user's gaze may be set to a certain distance (e.g., about 130 cm). The user may comfortably gaze at the visual stimulus image 250 on the bottom surface while using the vehicle 101.

The display 180 may be mounted such that the bottom surface and the output light have an inclination of a specific angle (e.g., about 26 degrees). Conditions such as a projection distance and a projection angle of the display 180 may be determined based on various factors such as the size of the visual stimulus image 250, brightness of the light reflected from the bottom surface, and a sitting state of the user such that the highest SSVEP recognition performance is achieved.

FIG. 2 shows the display 180 in the form of the projector, but aspects of the present disclosure are not limited thereto. For example, the display 180 may be AR glasses or any other suitable display devices.

Figure 3A:
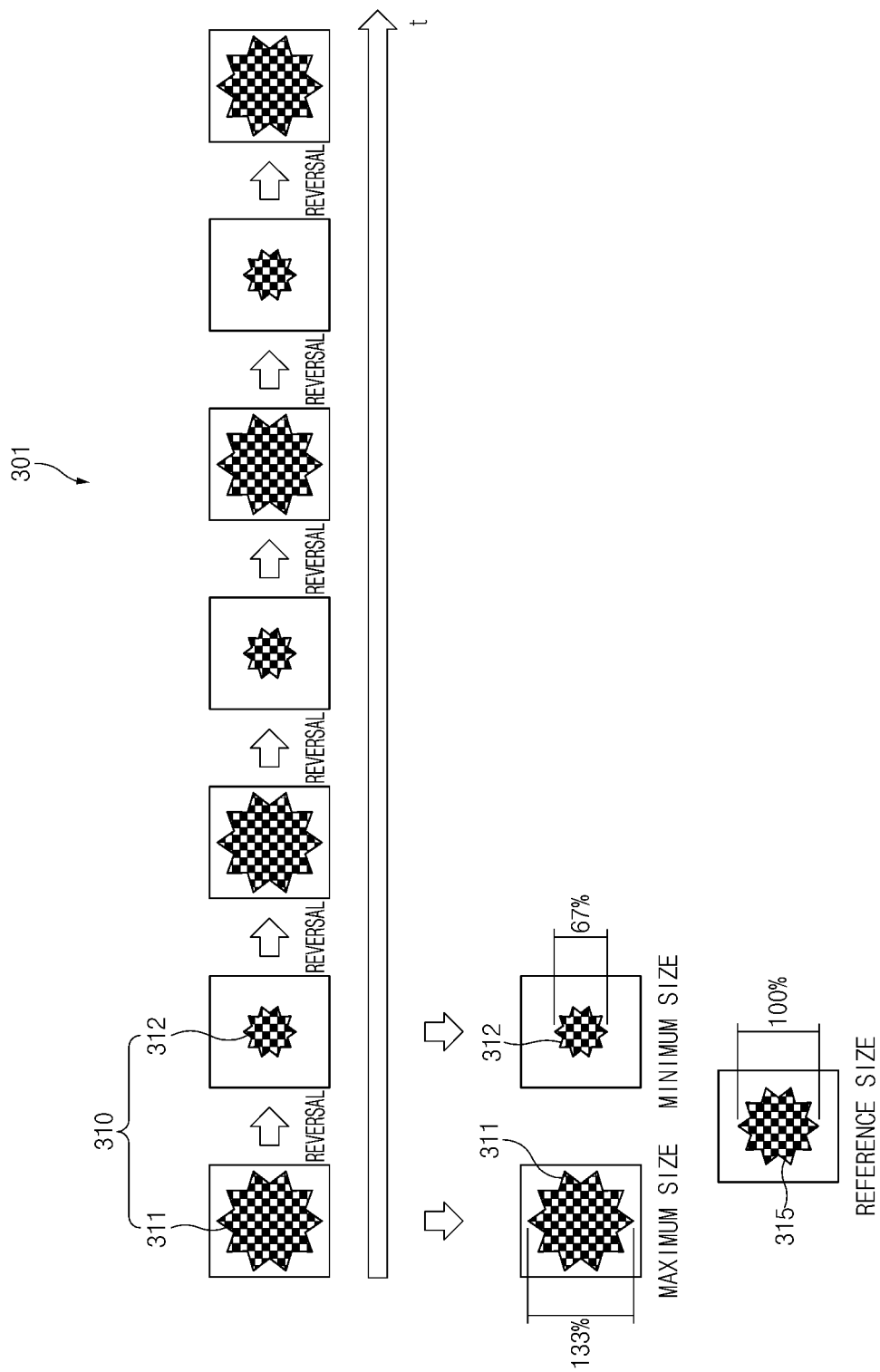
FIG. 3A shows a visual stimulus image containing a checkerboard stimulus of a varying size.

FIG. 3A shows a visual stimulus image containing a checkerboard stimulus of a varying size.

Referring to FIG. 3A, the controller 120 may output a visual stimulus image 301 via the display 180. The visual stimulus image 301 may include a visual stimulus object 310. The size of the visual stimulus object 310 may be changed (e.g., at the same time) as a pattern is changed over time. If the user gazes at the visual stimulus object 310 for a configured duration (e.g., 2 seconds), the SSVEP generated in the user's head may be measured/determined via the EEG device 110. The EEG device 110 may generate the EEG signal corresponding to the SSVEP and transmit the EEG signal to the controller 120. The controller 120 may receive the EEG signal from the EEG device 110. The controller 120 may move or rotate the drive 190 by analyzing the EEG signal and comparing a preset reference value with a value of the EEG signal.

The visual stimulus object 310 may be a stimulus in which the checkerboard pattern is reversed/reverted/toggled with a specific frequency (e.g., 6 Hz). The visual stimulus object 310 may change in size (e.g., at the same time) as the pattern is reversed/reverted/toggled. The visual stimulus object 310 may be changed from a first size stimulus 311 to a second size stimulus 312 over time, and again from the second size stimulus 312 to the first size stimulus 311. The frequency at which the pattern of the visual stimulus object 310 is changed and the frequency at which the size of the visual stimulus object 310 is changed may be same (e.g., 6 Hz).

The first size stimulus (e.g., the maximum size stimulus) 311 may be in a form enlarged by a specific ratio (e.g., +33% or any other ratio) compared to a reference size stimulus 315. The second size stimulus (e.g., the minimum size stimulus) 312 may be in a form reduced by a specific ratio (e.g., −33% or any other ratio) compared to the reference size stimulus 315. A size and the enlargement or reduction rate of the reference size stimulus 315 may be determined (e.g., predetermined in advance) to maximize the SSVEP recognition performance.

In the process in which the visual stimulus object 310 is enlarged or reduced, the size of each black or white rectangle constituting the checkerboard pattern may be maintained. The visual stimulus object 310 may be in a form of a polygonal star rather than a circle. Therefore, the user may easily recognize the size change of the visual stimulus object 310.

Although FIG. 3A shows the visual stimulus object of the checkerboard pattern, but aspects of the present disclosure are not limited thereto. A pattern of the visual stimulus object may be formed in various forms.

Figure 3B:
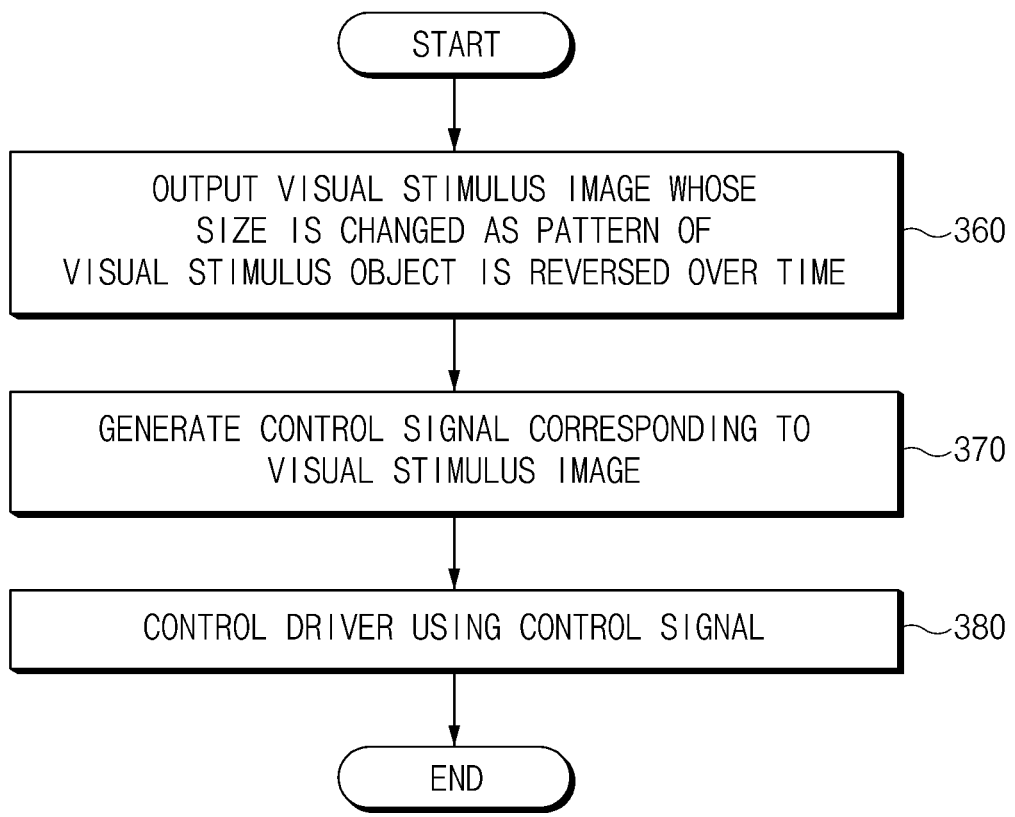
FIG. 3B is a method for controlling a vehicle.

FIG. 3B is a flowchart for a method for controlling a vehicle.

Referring to FIG. 3B, in operation 360, the controller 120 may output the visual stimulus image. The size of the visual stimulus image may be changed as the pattern of the visual stimulus object is reversed/reverted/toggled over time via the display 180.

For example, the controller 120 may output the visual stimulus image including the visual stimulus object of the checkerboard pattern via the display 180 (e.g., the LCD monitor, the projector, etc.). The controller 120 may control the visual stimulus object of the checkerboard pattern to be reversed/reverted/toggled in color and to be displayed such that a maximum size and a minimum size are repeated (e.g., a binary scheme or any other scheme, such as a tertiary scheme). The visual stimulus object may include the direction indication object (e.g., the turn-left and turn-right indication objects) or the stop indication object.

In operation 370, the controller 120 may generate the control signal corresponding to the visual stimulus image. The controller 120 may detect, via the EEG device 110, a specific brainwave of the user induced by the visual stimulus image. The EEG device 110 may be mounted on the user's head, and may measure the brainwave (e.g., the SSVEP) that occurs when the user gazes at the visual stimulus image. The EEG device 110 may be worn on the user's head (e.g., in a dry manner—not using a gel).

The controller 120 may generate the control signal corresponding to the brainwave detected via the EEG device 110. The controller 120 may receive a signal corresponding to the brainwave (e.g., the SSVEP) detected via the EEG device 110. The controller 120 may generate the control signal corresponding to the EEG signal received from the EEG device 110. For example, the control signal may include the go-straight signal, the turn-left signal, the turn-right signal, and the stop signal.

In operation 380, the controller 120 may control the drive 190 using the control signal. The controller 120 may transmit the generated control signal to the drive 190. The drive 190 may move, stop, or turn the direction of the vehicle 101, for example, in response to the received control signal.

The user may identify the gazing result of the visual stimulus image and provide feedback for the operation of the drive 190, and may control the movement of the vehicle 101.

Figure 4:
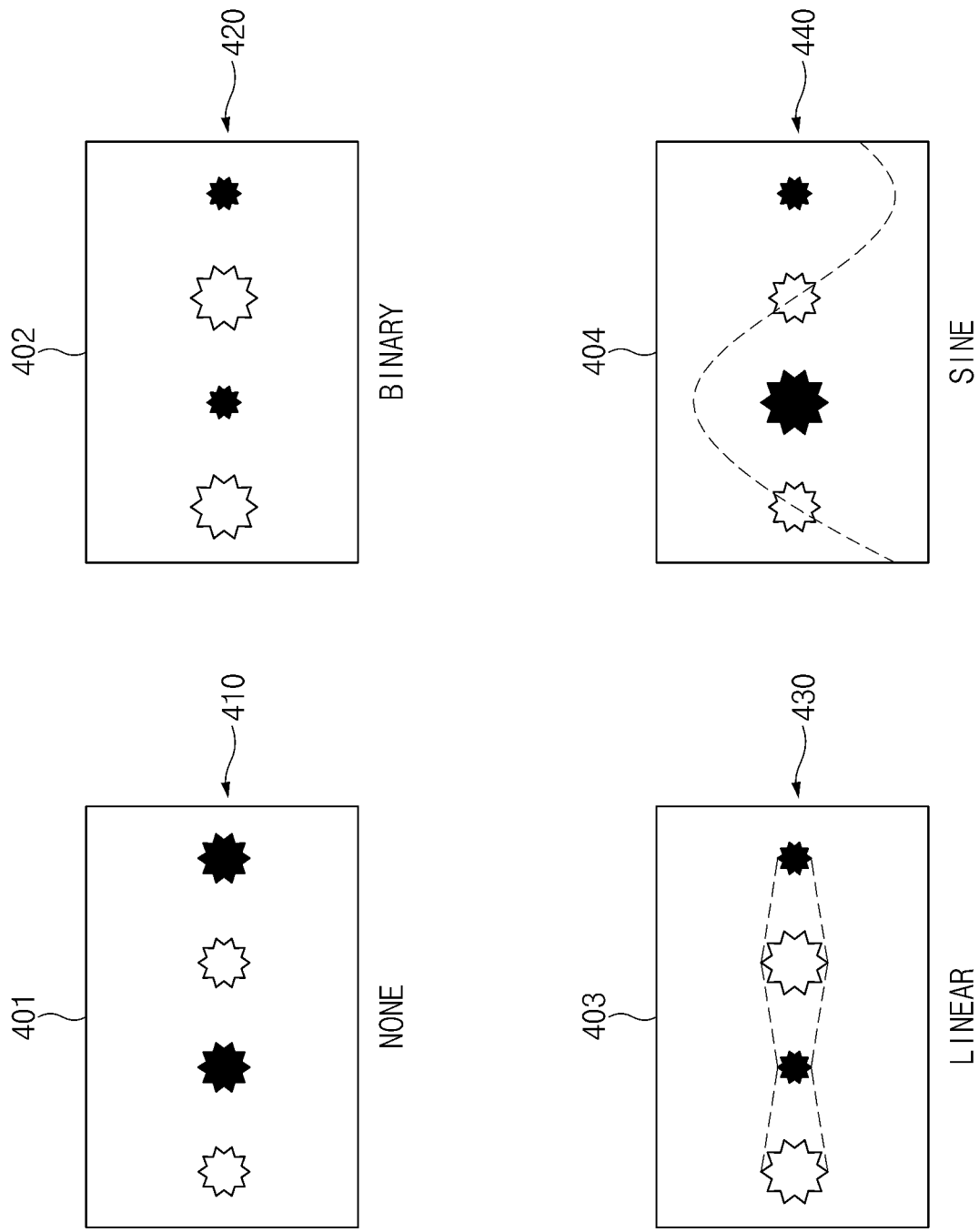
FIG. 4 shows a size change of a flickering visual stimulus object.

FIG. 4 shows examples of a size change of a flickering visual stimulus object. FIG. 4 is illustrative and aspects are not limited thereto.

Referring to FIG. 4, a first visual stimulus image 401 may include a first visual stimulus object 410 that flickers over time, but does not change in size (none). The first visual stimulus object 410 may be a stimulus of which size is maintained while a color thereof is reversed/reverted/toggled with a configured frequency (e.g., 6 Hz). The first visual stimulus object 410 may be in a form of the polygonal star that the user may easily recognize/perceive.

A second visual stimulus image 402 may include a second visual stimulus object 420 that flickers over time, and at the same time, changes in size in the binary scheme. The second visual stimulus object 420 may be a stimulus of which size is changed to a maximum size or a minimum size while a color thereof is reversed/reverted/toggled with a configured frequency (e.g., 6.67 Hz). Over time, the second visual stimulus object 420 may be changed from a first size stimulus (e.g., a maximum size stimulus) to a second size stimulus (e.g., a minimum size stimulus), and again, may be changed from the second size stimulus (e.g., the minimum size stimulus) to the first size stimulus (e.g., the maximum size stimulus).

The first size stimulus (e.g., the maximum size stimulus) may be in a form enlarged by a configured ratio (e.g., +33%) compared to a reference size stimulus. The second size stimulus (e.g., the minimum size stimulus) may be in a form reduced by a configured ratio (e.g., −33%) compared to the reference size stimulus. The second visual stimulus object 420 may be in a form of the polygonal star that the user may easily recognize/perceive.

A third visual stimulus image 403 may contain a third visual stimulus object 430 that flickers over time, and at the same time, changes in size in a linear scheme (e.g., a gradual change of the size from the maximum size to the minimum size or vice versa). The third visual stimulus object 430 may be a stimulus of which size is linearly changed between a maximum size and a minimum size while a color thereof is reversed/reverted/toggled at a configured frequency (e.g., 7.5 Hz). Over time, the third visual stimulus object 430 may be linearly changed from a first size stimulus (e.g., a maximum size stimulus) to a second size stimulus (e.g., a minimum size stimulus), and again, may be continuously/gradually changed from the second size stimulus (e.g., the minimum size stimulus) to the first size stimulus (e.g., the maximum size stimulus).

The first size stimulus (e.g., the maximum size stimulus) may be in a form enlarged by a configured ratio (e.g., +33%) compared to a reference size stimulus. The second size stimulus (e.g., the minimum size stimulus) may be in a form reduced by a configured ratio (e.g., −33%) compared to the reference size stimulus. The third visual stimulus object 430 may be in a form of the polygonal star that the user may easily recognize/perceive.

A fourth visual stimulus image 404 may include a fourth visual stimulus object 440 that flickers over time, and at the same time, changes in size in a sine wave (sine) form. The fourth visual stimulus object 440 may be a stimulus of which size is changed in the form of the sine wave while a color thereof is reversed/reverted/toggled at a configured frequency (e.g., 10 Hz). Over time, the fourth visual stimulus object 440 may be changed in order to a reference size stimulus, a maximum size stimulus, the reference size stimulus, and a minimum size stimulus, and again be changed to the reference size stimulus according to a rate of change of a amplitude of the sine wave. A rate of change of the magnitude of the fourth visual stimulus image 404 may be the same as the rate of change of the amplitude of the sine wave.

The maximum size stimulus may be in a form enlarged by a configured ratio (e.g., +33%) compared to the reference size stimulus. The minimum size stimulus may be in a form reduced by a configured ratio (e.g., −33%) compared to the reference size stimulus. The fourth visual stimulus object 440 may be in a form of the polygonal star that the user may easily recognize/perceive.

Among the first to fourth visual stimulus images 401 to 404, an average SSVEP recognition performance may be the highest in the third visual stimulus image (linear) 403. Visual fatigue may also be highest in the third visual stimulus image (linear) 403.

Figure 5A:
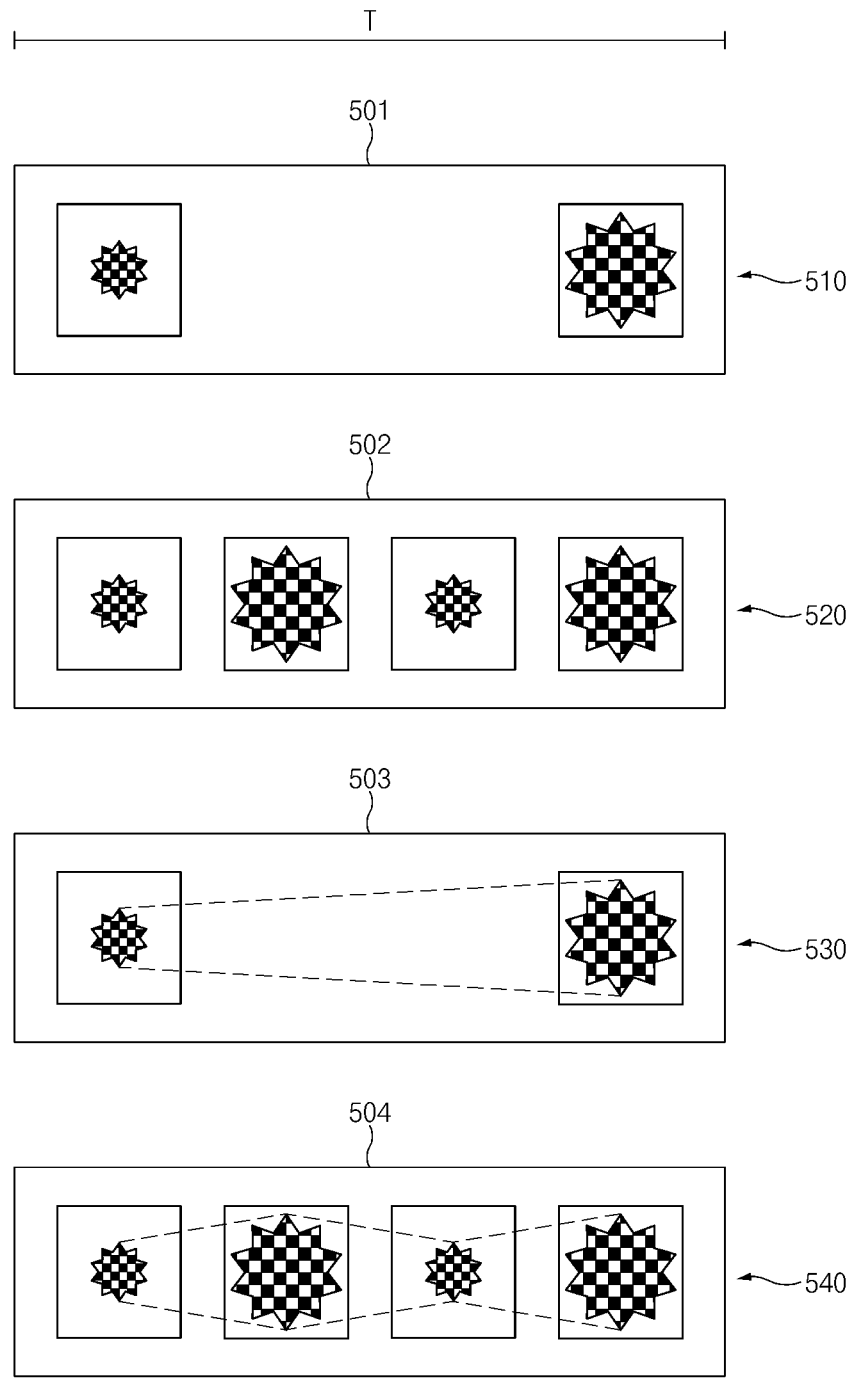
FIG. 5A shows a visual stimulus image containing a checkerboard stimulus that changes in size and speed.

FIG. 5A shows a visual stimulus image including a checkerboard stimulus that changes in size and speed. FIG. 5A is illustrative and aspects are not limited thereto.

Referring to FIG. 5A, a first visual stimulus image 501 may include a first visual stimulus object 510 in which a checkerboard pattern thereof is reversed/reverted/toggled over time, and at the same time, a size thereof changes in the binary scheme. The first visual stimulus object 510 may be a stimulus whose size is changed to a maximum size or a minimum size while the checkerboard pattern is reversed/reverted/toggled at a configured frequency (e.g., 6.67 Hz). In the process in which the size of the first visual stimulus object 510 is changed, a size of each black or white rectangle constituting the checkerboard pattern may be enlarged or reduced together.

Over time, the first visual stimulus object 510 may be changed directly from a first size stimulus (e.g., a minimum size stimulus) to a second size stimulus (e.g., a maximum size stimulus), and again, may be changed directly from the second size stimulus (e.g., the maximum size stimulus) to the first size stimulus (e.g., the minimum size stimulus). The first visual stimulus object 510 may be in a form of the polygonal star that the user may easily recognize/perceive.

A second visual stimulus image 502 may include a second visual stimulus object 520 in which a checkerboard pattern thereof is reversed/reverted/toggled over time, and at the same time, a size thereof changes in the binary scheme. The second visual stimulus object 520 may have a higher motion speed (e.g., ×2) than the first visual stimulus object 510 having a reference motion speed. At the same time period T, a motion change of the second visual stimulus object 520 may be twice faster than that of the first visual stimulus object 510.

A third visual stimulus image 503 may include a third visual stimulus object 530 in which a checkerboard pattern thereof is reversed/reverted/toggled over time, and at the same time, a size thereof changes in the linear scheme. The third visual stimulus object 530 may be a stimulus whose size is linearly and gradually changed to a maximum size or a minimum size while the checkerboard pattern is reversed/reverted/toggled at a configured frequency (e.g., 7.5 Hz). In the process in which the size of the third visual stimulus object 530 is changed, a size of each black or white rectangle constituting the checkerboard pattern may be enlarged or reduced together.

Over time, the third visual stimulus object 530 may be linearly and gradually changed from a first size stimulus (e.g., the minimum size stimulus) to a second size stimulus (e.g., the maximum size stimulus), and again, may be continuously and gradually changed from the second size stimulus (e.g., the maximum size stimulus) to the first size stimulus (e.g., the minimum size stimulus). The third visual stimulus object 530 may be in a form of the polygonal star that the user may easily recognize/perceive.

A fourth visual stimulus image 504 may include a fourth visual stimulus object 540 in which a checkerboard pattern thereof is reversed/reverted/toggled over time, and at the same time, a size thereof changes in the linear scheme. The fourth visual stimulus object 540 may have a higher motion speed (e.g., ×2) than the third visual stimulus object 530 having the reference motion speed. At the same time period T, a motion change of the fourth visual stimulus object 540 may be twice faster than that of the third visual stimulus object 530.

Among the first to fourth visual stimulus images 501 to 504, the average SSVEP recognition performance may be the highest in the first visual stimulus image 501 that has the basic motion speed and changes in the binary scheme.

The visual fatigue may be the lowest in the first visual stimulus image 501 and the third visual stimulus image 503 of the basic motion speed.

Figure 5B:
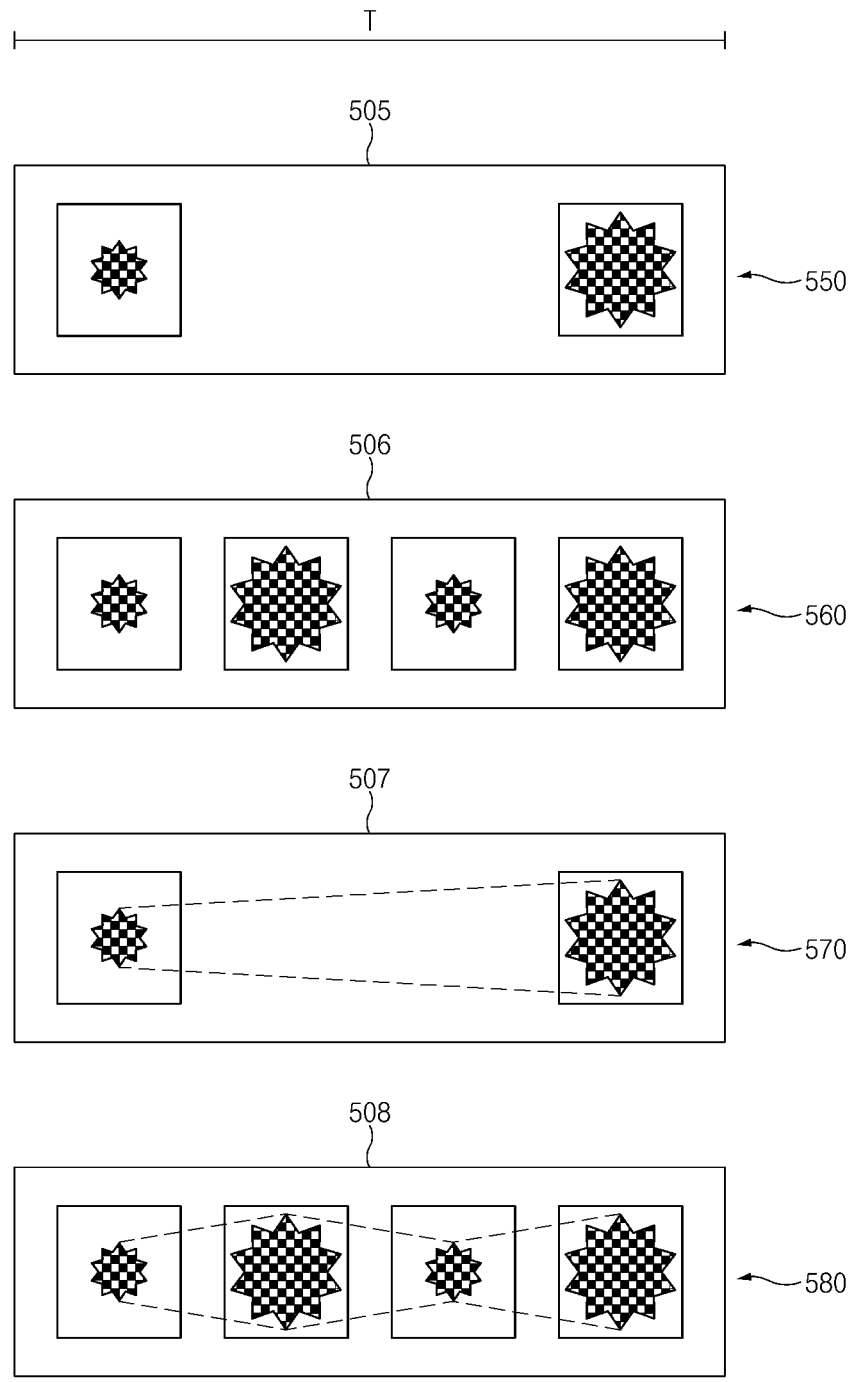
FIG. 5B shows a visual stimulus image containing a checkerboard stimulus in which a size of a pattern is maintained while a size and a speed of the stimulus are changed.

FIG. 5B shows a visual stimulus image including a checkerboard stimulus in which a size of a pattern is maintained while a size and a speed of the stimulus are changed. FIG. 5B is illustrative and aspects are not limited thereto.

Referring to FIG. 5B, a fifth visual stimulus image 505 may include a fifth visual stimulus object 550 in which a checkerboard pattern thereof is reversed/reverted/toggled over time, and at the same time, a size thereof changes in the binary scheme. Unlike the first visual stimulus object 510 in FIG. 5A, in the process in which the size of the fifth visual stimulus object 550 is changed, a size of each black or white rectangle/square constituting the checkerboard pattern may be maintained without being enlarged or reduced.

A sixth visual stimulus image 506 may include a sixth visual stimulus object 560 in which a checkerboard pattern thereof is reversed/reverted/toggled over time, and at the same time, a size thereof is changed in the binary scheme. The sixth visual stimulus object 560 may have a higher motion speed (e.g., ×2) than the fifth visual stimulus object 550 having the reference motion speed.

Unlike the second visual stimulus object 520 in FIG. 5A, in the process in which the size of the sixth visual stimulus object 560 is changed, a size of each black or white rectangle/square constituting the checkerboard pattern may be maintained without being enlarged or reduced.

A seventh visual stimulus image 507 may include a seventh visual stimulus object 570 in which a checkerboard pattern thereof is reversed/reverted/toggled over time, and at the same time, a size thereof is changed in the linear scheme. Unlike the third visual stimulus object 530 in FIG. 5A, in the process in which the size of the seventh visual stimulus object 570 is changed, a size of each black or white rectangle/square constituting the checkerboard pattern may be maintained without being enlarged or reduced.

An eighth visual stimulus image 508 may include an eighth visual stimulus object 580 in which a checkerboard pattern thereof is reversed/reverted/toggled over time, and at the same time, a size thereof is changed in the binary scheme. The eighth visual stimulus object 580 may have a higher motion speed (e.g., ×2) than the seventh visual stimulus object 570 having the reference motion speed.

Unlike the fourth visual stimulus object 540 in FIG. 5A, in the process in which the size of the eighth visual stimulus object 580 is changed, a size of each black or white rectangle/square constituting the checkerboard pattern may be maintained without being enlarged or reduced.

The average SSVEP recognition performance may be higher in the fifth to eighth visual stimulus images 505 to 508 in FIG. 5B in which a grid size is fixed than the average SSVEP recognition performance of the first to fourth visual stimulus images 501 to 504 in FIG. 5A in which the grid size changes.

The visual fatigue may be the lowest in the fifth visual stimulus image 505 in FIG. 5B that is fixed in the grid size and is changed in the binary scheme.

FIG. 6 shows a size change of a visual stimulus object having a checkerboard pattern.

Referring to FIG. 6, a first visual stimulus image 601 may include a first visual stimulus object 610 in which a checkerboard pattern thereof is reversed/reverted/toggled, but a size thereof is not changed (none). The first visual stimulus object 610 may be a stimulus of which size is maintained while the checkerboard pattern thereof is reversed/reverted/toggled with a configured frequency (e.g., 6 Hz). The first visual stimulus object 610 may be in a form of the polygonal star that the user may easily recognize/perceive.

A second visual stimulus image 602 may include a second visual stimulus object 620 in which a checkerboard pattern thereof is reversed/reverted/toggled over time, and at the same time, a size thereof changes in the binary scheme. The second visual stimulus object 620 may be a stimulus of which size is changed to a maximum size or a minimum size while the checkerboard pattern is reversed/reverted/toggled with a configured frequency (e.g., 6.67 Hz). Over time, the second visual stimulus object 620 may be changed directly from a first size stimulus (e.g., a maximum size stimulus) to a second size stimulus (e.g., a minimum size stimulus), and again, may be changed directly from the second size stimulus (e.g., the minimum size stimulus) to the first size stimulus (e.g., the maximum size stimulus).

The second visual stimulus object 620 may be in a form of the polygonal star that the user may easily recognize/perceive. In the process in which the size of the second visual stimulus object 620 is changed, a size of each black or white rectangle/square constituting the checkerboard pattern may be maintained without being enlarged or reduced.

A third visual stimulus image 603 may include a third visual stimulus object 630 in which a checkerboard pattern thereof is reversed/reverted/toggled over time, and at the same time, a size thereof changes in the linear scheme. The third visual stimulus object 630 may be a stimulus of which size is linearly and gradually changed between a maximum size and a minimum size while a color thereof is reversed/reverted/toggled with a configured frequency (e.g., 7.5 Hz). Over time, the third visual stimulus object 630 may be linearly changed from a first size stimulus (e.g., a maximum size stimulus) to a second size stimulus (e.g., a minimum size stimulus), and again, may be continuously and gradually changed from the second size stimulus (e.g., the minimum size stimulus) to the first size stimulus (e.g., the maximum size stimulus).

The third visual stimulus object 630 may be in a form of the polygonal star that the user may easily recognize/perceive. In the process in which the size of the third visual stimulus object 630 is changed, a size of each black or white rectangle/square constituting the checkerboard pattern may be maintained without being enlarged or reduced.

A fourth visual stimulus image 604 may contain a fourth visual stimulus object 640 in which a checkerboard pattern thereof is reversed/reverted/toggled over time, and at the same time, a size thereof is changed in the sine wave (sine)

form. The fourth visual stimulus object 640 may be a stimulus of which size is changed in the form of the sine wave while a color thereof is reversed/reverted/toggled with a configured frequency (e.g., 10 Hz). Over time, the fourth visual stimulus object 640 may be continuously and gradually changed based on the sinusoidal characteristics into a reference size stimulus, a maximum size stimulus, the reference size stimulus, and a minimum size stimulus, and again be changed to the reference size stimulus.

The fourth visual stimulus object 640 may be in a form of the polygonal star that the user may easily recognize/perceive. In the process in which the size of the fourth visual stimulus object 640 is changed, a size of each black or white rectangle/square constituting the checkerboard pattern may be maintained without being enlarged or reduced.

The average SSVEP recognition performance may be highest in the second visual stimulus image 602 that is fixed in the grid size and is changed in size in the binary scheme. The visual fatigue may be the lowest in the second visual stimulus image 602 that is fixed in the grid size and is changed in size in the binary scheme.

Comparing the visual stimulus images of the flicker scheme in FIG. 4 with the visual stimulus images of the checkerboard pattern in FIG. 6, the average SSVEP recognition performance may be high in the third visual stimulus image linear 403 in FIG. 4, the fourth visual stimulus image (sine) 404 in FIG. 4, and the second visual stimulus image (binary) 602 in FIG. 6. The visual fatigue may be very high in the third visual stimulus image (linear) 403 in FIG. 4 and the fourth visual stimulus image (sine) 404 in FIG. 4, and may be the lowest in the second visual stimulus image (binary) 602 in FIG. 6.

If the display 180 is the LCD or LED monitor, the average SSVEP recognition performance may be the highest in the second visual stimulus image 602 that is fixed in the grid size and is changed in size in the binary scheme. The visual fatigue may also be the lowest in the second visual stimulus image 602 that is fixed in the grid size and is changed in size in the binary scheme.

If the display 180 is a projector, the average SSVEP recognition performance may be highest in the second visual stimulus image 602 that is fixed in the grid size and is changed in size in the binary scheme. The visual fatigue may also be the lowest in the second visual stimulus image 602 that is fixed in the grid size and is changed in size in the binary scheme.

Figure 7:
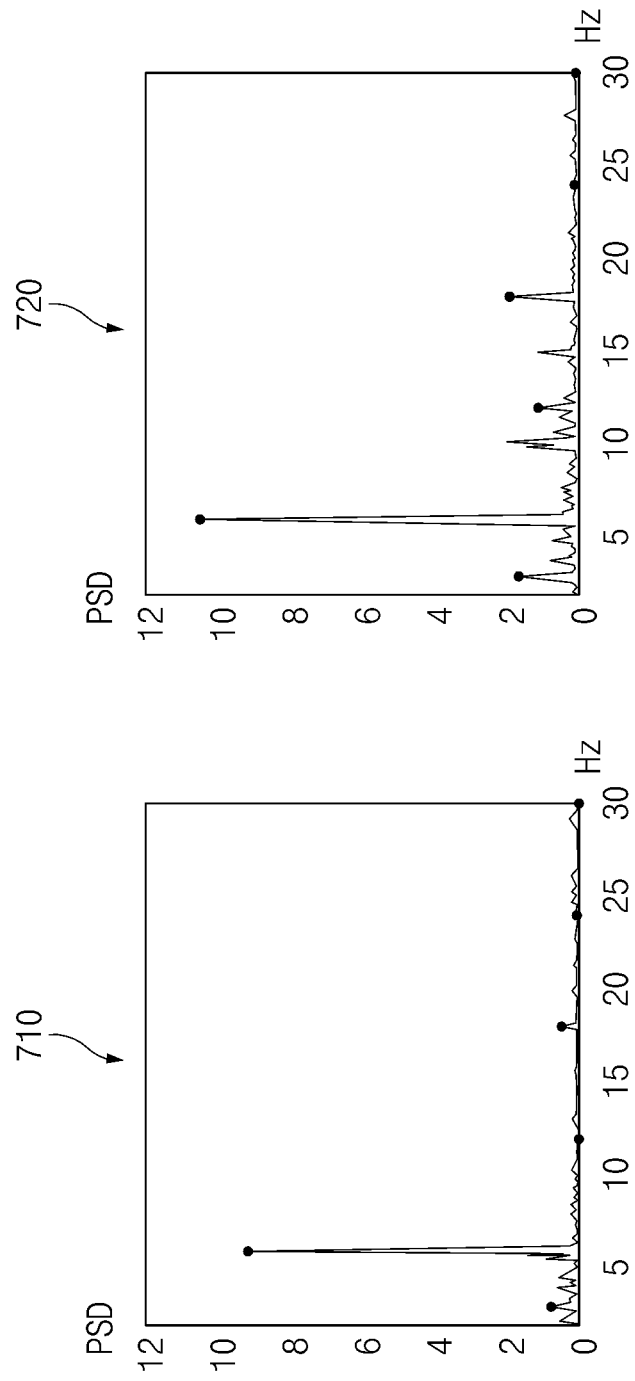
FIG. 7 is a graph showing a degree of occurrence of SSVEP.

FIG. 7 is a graph showing a degree of occurrence of SSVEP.

Referring to FIG. 7, a first graph 710 shows an intensity of SSVEP measured based on the first visual stimulus image 601 in FIG. 6 with only the reversal/reversion/toggling of the checkerboard pattern and no size change in an Oz region of a user's occipital region (e.g., occipital cortex). A second graph 720 shows an intensity of SSVEP measured based on the second visual stimulus image 602 in FIG. 6 with the reversal/reversion/toggling of the checkerboard pattern and the size change in the binary scheme in the Oz region of the user's occipital region.

If the visual stimulus image is displayed with a stimulus frequency of 6 Hz, the intensity of the SSVEP measured in the second graph 702 may be greater than the intensity of the SSVEP measured in the first graph 701. The SSVEP recognition performance of the visual stimulus image in which the checkerboard pattern is reversed/reverted/toggled and the size is changed in the binary scheme may be high.

According to an aspect of the present disclosure, a vehicle may include a drive for driving the vehicle, a display for outputting a visual stimulus image, and a controller that controls the drive and the display, the visual stimulus image contains a visual stimulus object having a repeating pattern, and the controller outputs, via the display, the visual stimulus image in which a size of the visual stimulus object changes as the pattern is reversed/reverted/toggled over time.

The visual stimulus object may be associated with a movement of the vehicle.

The visual stimulus object may include a plurality of visual stimulus objects respectively output at different frequencies.

The pattern may be a checkerboard pattern.

An arrangement state of the pattern may be maintained while the size of the visual stimulus object is changed.

The visual stimulus object may be in a form of repetition of a stimulus of a first size and a stimulus of a second size over time.

The first size may be a size enlarged by a first ratio from a preset reference size.

The second size may be a size reduced by a second ratio from a preset reference size.

The visual stimulus object may change in the size based on a preset waveform.

The visual stimulus object may be in a form of a polygonal star.

The display may be a projector, and the controller may output the visual stimulus image on a surface spaced apart by a specified distance from the vehicle.

The visual stimulus object may be disposed in a lower end region in a vertical direction in the visual stimulus image.

The projector may be mounted at a lower end of the vehicle.

The vehicle may further include an electroencephalogram (EEG) device for sensing a specified brainwave of a user, and the EEG device may establish a channel with the controller by a specified wireless communication scheme, and transmit a signal corresponding to the brainwave to the controller via the channel.

The EEG device may be mounted on a head of the user in a dry scheme to generate an electrical signal corresponding to the brainwave.

The brainwave may be a steady-state visual evoked potential (SSVEP).

According to an aspect of the present disclosure, a method for controlling a vehicle may include outputting, via a display of the vehicle, a visual stimulus image in which a size of a visual stimulus object changes as a pattern of the visual stimulus object is reversed/reverted/toggled over time, generating a control signal corresponding to the visual stimulus image, and controlling the vehicle using the control signal.

The generating of the control signal may include detecting, via an electroencephalogram (EEG) device of the vehicle, a specified brainwave of a user induced by the visual stimulus image, and generating the control signal corresponding to the brainwave.

The visual stimulus object may include a plurality of visual stimulus objects respectively output at different frequencies.

The pattern may be a checkerboard pattern whose arrangement state is maintained while the size of the visual stimulus object is changed.

Figure 8:
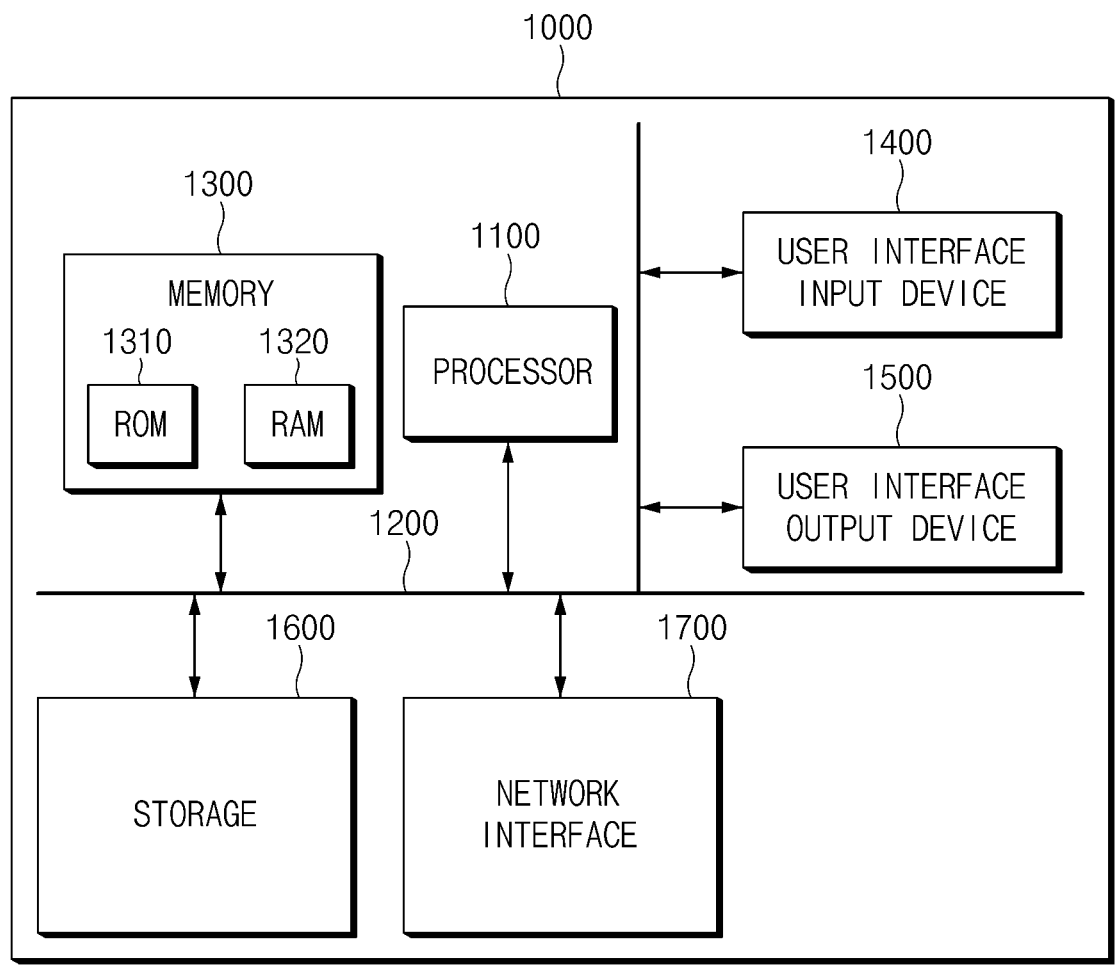
FIG. 8 shows a computing system.

FIG. 8 shows a computing system.

With reference to FIG. 8, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

The operations of the method and/or the algorithm described in connection with the examples disclosed herein may be embodied directly in hardware and/or a software module executed by the processor 1100, or in a combination thereof. The software module may reside on a storage medium (e.g., the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100, which may read information from, and write information to, the storage medium. In another configuration, the storage medium may be integral with the processor 1100. The processor and the storage medium may reside within an application specific integrated circuit (ASIC). The ASIC may reside within the user terminal. In another configuration, the processor and the storage medium may reside as individual components in the user terminal.

The description above is merely illustrative of the technical ideas of the present disclosure, and various modifications and changes may be made by those skilled in the art without departing from the essential characteristics of the present disclosure.

Therefore, the examples disclosed the present disclosure are not intended to limit the technical ideas of the present disclosure but to illustrate the present disclosure, and the scope of the technical ideas of the present disclosure is not limited by the embodiments. The scope of the present disclosure should be construed as being covered by the scope of the appended claims, and all technical ideas falling within the scope of the claims should be construed as being included in the scope of the present disclosure.

The present technology may provide the visual stimulus that may maintain high performance even in various display environments with poor SSVEP recognition performance compared to the LCD display. The SSVEP recognition performance may be maintained even in a replaceable display such as the projector.

The present technology may use the visual stimulus image in which the checkerboard stimulus is reversed/reverted/toggled and the size of the object is changed in the binary scheme to improve the SSVEP recognition performance and reduce the visual fatigue.

The present technology may determine a size change rate of the visual stimulus to correspond to a display environment, such as the number of stimuli, a distance between the stimuli, and the like, to minimize visual interference between the stimuli and to maximize the SSVEP recognition performance.

In addition, various effects that are directly or indirectly identified through the present document may be provided.

Hereinabove, although the present disclosure has been described with reference to various examples and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle comprising:
a drive configured to drive the vehicle;
a display configured to output a visual stimulus image; and
a controller configured to control the drive and the display,
wherein the visual stimulus image comprises a visual stimulus object associated with a repeating pattern,
wherein the controller is configured to control an output, via the display, of the visual stimulus image in which a size of the visual stimulus object changes over time,
wherein the repeating pattern is a checkerboard pattern, and
wherein sizes of rectangles of the checkerboard pattern do not change while the size of the visual stimulus object is changed.

2. The vehicle of claim 1, wherein the visual stimulus object is associated with a movement of the vehicle.

3. The vehicle of claim 1, wherein the visual stimulus object comprises a plurality of visual stimulus objects respectively associated with different output frequencies.

4. The vehicle of claim 1, wherein the visual stimulus object is in a form of repetition of a stimulus of a first size and a stimulus of a second size over time.

5. The vehicle of claim 4, wherein the first size is a size enlarged by a ratio from a reference size.

6. The vehicle of claim 4, wherein the second size is a size reduced by a ratio from a reference size.

7. The vehicle of claim 1, wherein the size of the visual stimulus object changes according to a rate of change of amplitude of a preset waveform.

8. The vehicle of claim 1, wherein the visual stimulus object comprises a form of a polygonal star.

9. The vehicle of claim 1, wherein the display is a projector, and
wherein the controller is configured to control the display to output the visual stimulus image on a portion of a surface spaced apart from the vehicle.

10. The vehicle of claim 9, wherein the projector is mounted at a lower end of the vehicle.

11. The vehicle of claim 1, wherein the visual stimulus object is disposed in a lower end region in a vertical direction in the visual stimulus image.

12. The vehicle of claim 1, further comprising:
an electroencephalogram (EEG) device configured to:
sense a brainwave of a user;
establish a channel with the controller via a wireless communication; and
transmit a signal corresponding to the brainwave to the controller via the channel.

13. The vehicle of claim 12, wherein the EEG device is configured for mounting on a head of the user to generate an electrical signal corresponding to the brainwave, and
wherein the brainwave is associated with a steady-state visual evoked potential (SSVEP).

14. The vehicle of claim 1, wherein black portions of the checkerboard pattern and white portions of the checkerboard pattern are periodically reversed over time.

15. The vehicle of claim 1, wherein the controller is configured to display, via the display, a first visual stimulus object associated with a first directional movement of the vehicle and a second visual stimulus object associated with a second directional movement of the vehicle, wherein the first visual stimulus object is output based on a first flickering frequency, and wherein the second visual stimulus object is output based on a second flickering frequency different from the first flickering frequency.

16. A method comprising:

outputting, via a display of a vehicle, a visual stimulus image in which a size of a visual stimulus object changes over time, wherein the visual stimulus object is associated with a repeating pattern;

generating a control signal corresponding to the visual stimulus image; and controlling the vehicle using the control signal, wherein the repeating pattern is a checkerboard pattern, and wherein black portions of the checkerboard pattern and white portions of the checkerboard pattern are periodically reversed over time, and wherein sizes of rectangles of the checkerboard pattern do not change while the size of the visual stimulus object is changed.

17. The method of claim 16, wherein the generating of the control signal comprises:

detecting, via an electroencephalogram (EEG) device of the vehicle, a brainwave of a user induced by the visual stimulus image, wherein the control signal corresponds to the brainwave.

18. The method of claim 16, wherein the visual stimulus object comprises a plurality of visual stimulus objects respectively associated with different output frequencies.

19. The method of claim 16, wherein an arrangement state of the repeating pattern is maintained while the size of the visual stimulus object is changed.

20. A vehicle comprising:

a drive configured to drive the vehicle;

a display configured to output at least one visual stimulus image;

a processor; and memory storing instructions that, when executed by the processor, cause the vehicle to:

output a visual stimulus image, wherein the visual stimulus image comprises a visual stimulus object associated with a repeating pattern, wherein the repeating pattern is a checkerboard pattern, and wherein black portions of the checkerboard pattern and white portions of the checkerboard pattern are periodically reversed over time, control an output, via the display, of the visual stimulus image in which a size of the visual stimulus object changes over time, detect, via an electroencephalogram (EEG) device of the vehicle, a brainwave of a user induced by the visual stimulus image, and control, based on the detected brainwave, the drive to move the vehicle, wherein sizes of rectangles of the checkerboard pattern do not change while the size of the visual stimulus object is changed.

* * * * *